United States Patent
Uttaro et al.

(10) Patent No.: US 10,218,607 B2
(45) Date of Patent: Feb. 26, 2019

(54) FLOW DISTRIBUTION USING FABRIC ACCESS TUNNELS

(71) Applicant: AT&T Intellectual Property I, L.P., Atlanta, GA (US)

(72) Inventors: James Uttaro, Staten Island, NY (US); Tuan Duong, Eatontown, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 71 days.

(21) Appl. No.: 15/417,849

(22) Filed: Jan. 27, 2017

(65) Prior Publication Data

US 2018/0219769 A1  Aug. 2, 2018

(51) Int. Cl.
*H04L 12/721* (2013.01)
*H04L 12/46* (2006.01)

(52) U.S. Cl.
CPC .......... *H04L 45/38* (2013.01); *H04L 12/4633* (2013.01); *H04L 12/4641* (2013.01); *H04L 45/66* (2013.01)

(58) Field of Classification Search
CPC . H04L 45/38; H04L 12/4633; H04L 12/4641; H04L 45/66
See application file for complete search history.

(56) References Cited

U.S. PATENT DOCUMENTS

| | | | |
|---|---|---|---|
| 7,460,491 B2 | 12/2008 | Singh et al. | |
| 8,340,102 B2 | 12/2012 | Delregno | |
| 8,351,325 B2 | 1/2013 | Hinz et al. | |
| 8,693,323 B1 | 4/2014 | McDysan | |
| 8,730,956 B2* | 5/2014 | Kini | H04L 12/462 370/256 |
| 9,048,889 B1 | 6/2015 | Vijayaraghavan et al. | |
| 9,164,795 B1* | 10/2015 | Vincent | H04L 12/4633 |
| 9,264,974 B2 | 2/2016 | Ankaiah et al. | |
| 2003/0115480 A1* | 6/2003 | McDysan | H04L 63/0272 726/36 |
| 2003/0174706 A1* | 9/2003 | Shankar | H04L 12/4625 370/393 |
| 2006/0245438 A1* | 11/2006 | Sajassi | H04L 12/18 370/399 |
| 2013/0230045 A1 | 9/2013 | Xu | |

FOREIGN PATENT DOCUMENTS

EP    1501246 A2    1/2005

OTHER PUBLICATIONS

Jakimoski et al.; "Carrier-Class VPN to Cloud Evolution"; Int'l Journal of Grid and Distributed vol. 8 No. 6; 2015; p. 41-48.

* cited by examiner

*Primary Examiner* — Duc C Ho
(74) *Attorney, Agent, or Firm* — Baker & Hostetler LLP

(57) ABSTRACT

A mechanism is created within the tunnel context, in which a plurality of tunnels may resolve a given customer's traffic associated with a virtual local area network. The use of a tunnel context may allow distribution of traffic across multiple servers and other devices, such as across top of rack switches and different parts of the fabric infrastructure.

14 Claims, 15 Drawing Sheets

FLOW DISTRIBUTION USING FABRIC ACCESS TUNNELS

TECHNICAL FIELD

The technical field generally relates to tunneling and, more specifically, fabric tunnels.

BACKGROUND

The MPLS network can be used successfully by network service providers, which provide a virtual private network service for their customers. Further improvements in these networks are possible, especially in a circumstance where a system is being replaced or upgraded in order to avoid loss of service for the customer.

SUMMARY

Disclosed herein distributing network traffic across a set of tunnels such that resources may be used in a more efficient manner than in conventional systems. With the use of a tunnel context, a customer's traffic may be distributed across a set of tunnels utilizing hashing methods (e.g., IP, MAC, etc.). A mechanism is created within the tunnel context, in which a plurality of tunnels may resolve a given customer's traffic. The use of a tunnel context may allow distribution of traffic across multiple servers and other devices, such as across top of rack switches and different parts of the fabric infrastructure.

In an example, a switch may include a processor and a memory coupled with the processor. The memory may include executable instructions that when executed by the processor cause the processor to effectuate operations that include: receiving first data from a layer two switch, wherein the first data is from a port on a first virtual local area network (VLAN); relating the first data a tunnel context of a virtual private network (VPN) tunnel, wherein the VPN tunnel remotely terminates on at least a first virtual machine and a second virtual machine; and forwarding the first data through the VPN tunnel based on the tunnel context.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Disclosed herein distributing network traffic across a set of tunnels such that resources may be used in a more efficient manner than in conventional systems. With the use of a tunnel context, a customer's traffic may be distributed across a set of tunnels utilizing hashing methods (e.g., IP, MAC, etc.). A mechanism is created within the tunnel context, in which a plurality of tunnels may resolve a given customer's traffic. The use of a tunnel context may allow distribution of traffic across multiple servers and other devices, such as across top of rack switches and different parts of the fabric infrastructure. This may facilitate efficient use of fabric, switches, and virtual machines (VMs), among other things.

Figure 1:
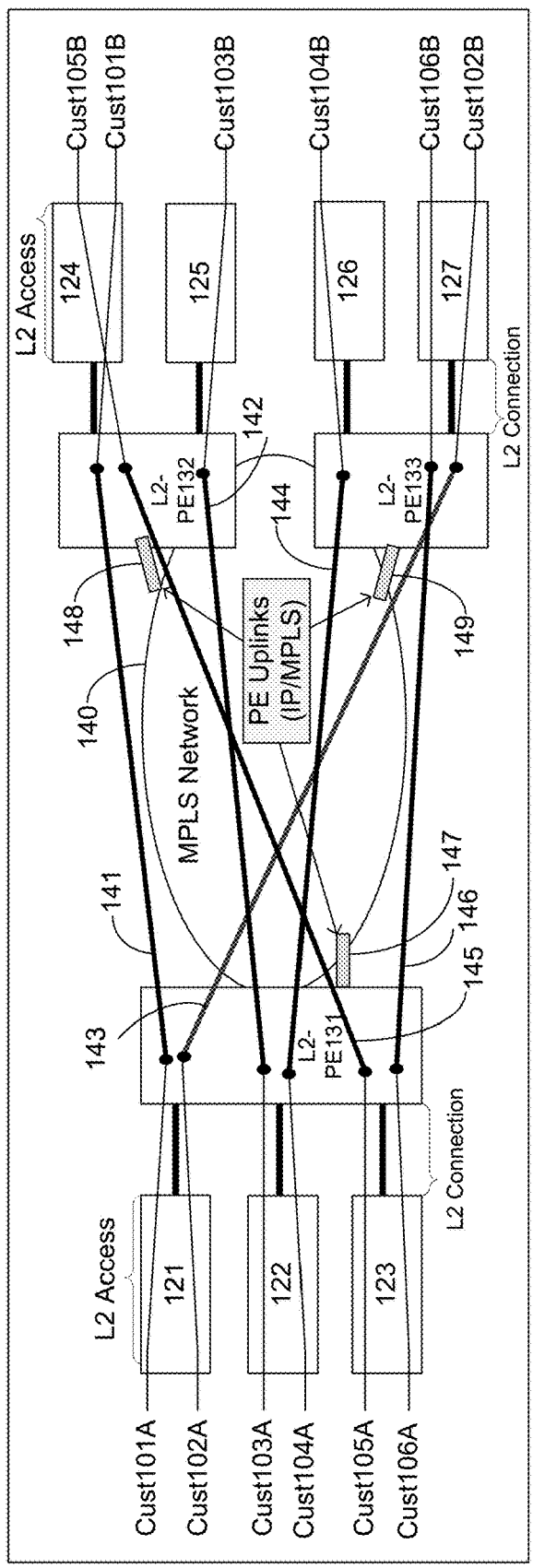
FIG. 1 illustrates an exemplary network for layer 2 (L2) point-to-point transport service for virtual local area networks (VLANs).

FIG. 1 illustrates an exemplary network for layer 2 (L2) point-to-point transport service for virtual local area networks (VLANs). In FIG. 1, there are several customer devices (e.g., routers) connected to layer 2 access devices (e.g., layer 2 switches). L2-PE 131 may be connected with MPLS network 140 via provider edge (PE) link 147. PE may be considered the edge point of a Service Provider's network where customer services may be instantiated. L2-PE 131 is where a L2 service is instantiated. L2 services may include point-to-point transport of customer VLANs or multi-Point connectivity of customer sites. Link 147 (as well as link 148 and link 149) connects with the core that runs the dynamic routing protocol and allows for the build of the MPLS tunnels across MPLS network 140. L2-PE 131 may be connected, by L2 connections, with layer 2 access devices, such as L2-Access 121, L2-Access 122, or L2-Access 123. The L2 Access devices may be connected with a customer device on one or more ports. Here, L2-Access 131 may be connected with cust 101A and cust 102A, L2-Access 132 may be connected with customer 103A and cust 104A. L2-Access 133 may be connected with cust 105A and cust 106A. L2 PE devices (e.g., L2-PE 131, L2-PE 132, or L2-PE 133) terminate tunnels or are connected with L2-access devices (e.g., L2-Access 124, L2-Access 125, L2-Access 126, or L2-Access 127) as shown in FIG. 1. The L2 tunnels (e.g., tunnel 141, tunnel 142, tunnel 143, tunnel 144, tunnel 145, and tunnel 146) correspond to each customer device, respectively, such as cust 101A/cust 101B, cust 102A/cust 102B, cust 103A/cust 103B, cust 104A/cust 104B, cust 105A/cust 105B, or cust 106A/cust 106B. Wherein "A" and "B" denotes different locations or terminations of a customer circuit, usually at a different location.

Conventionally, as discussed above with reference to FIG. 1, in the layer 2 point-to-point transport context, customer traffic may be transported over an MPLS tunnel. As shown in FIG. 1, there are six MPLS tunnels, one for each customer, such that there is only one VLAN in each tunnel. There must be a unique VLAN per L2-PE.

Figure 2:
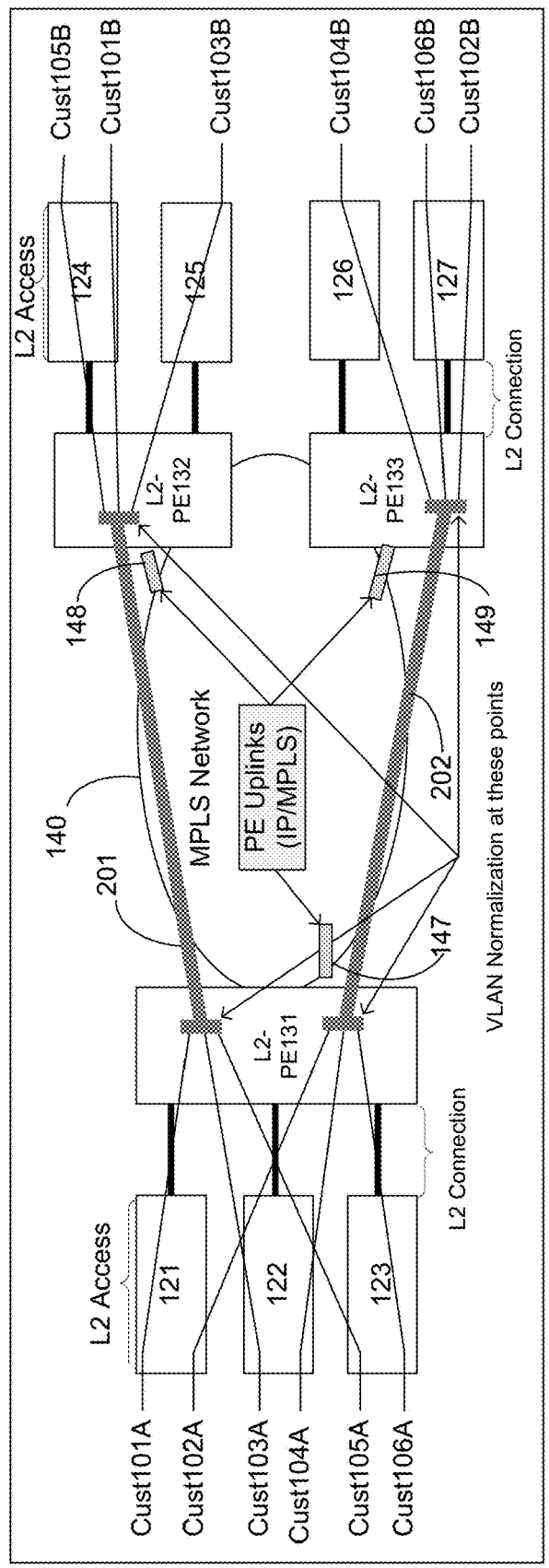
FIG. 2 illustrates an exemplary network for layer 2 (L2) point-to-point transport service for virtual local area networks (VLANs) using tunnel context.

FIG. 2 also illustrates an exemplary network for layer 2 (L2) point-to-point transport service for virtual local area networks (VLANs). Discussed below, with reference to the network of FIG. 2, is an exemplary scenario for transporting traffic of a plurality of VLANs over a tunnel using a tunnel context. Traffic of cust 101A arrives on a port (e.g., port 101A) of L2-Access 121 that is assigned to VLAN #100, for example. Also, cust 103A arrives on a port (e.g., port 103A) of L2-Access 122 that is assigned to VLAN #100 and cust 105A arrives on a port (e.g., port 105A) of L2-Access 123 that is assigned to VLAN #100. The aforementioned configurations of cust 101A, cust 103A, and cust 105A are allowable, because each VLAN has local significance. Each VLAN is assigned a tunnel context. This tunnel context, in summary, is an assignment of a VLAN to particular tunnel, which, in this scenario, is tunnel 201. Since traffic of cust 101A, cust 103A, and cust 105A traverses the same tunnel 201, the traffic is normalized. The traffic is normalized by mapping (e.g., muxing) the received VLANs to another VLAN number (e.g., tag). In an example, on L2-PE 131 there may be a mapping as shown in exemplary Table 1 for traffic that flows through tunnel 201 to the terminating L2-PE 132. Here the tags (e.g., P101A, V100) are rewritten according to Table 1 to have local significance across tunnel 201.

TABLE 1

| Incoming Port (P) and VLAN (V) | Outgoing Tunnel Port and VLAN |
|---|---|
| P101A, V100 | P147, V100 |
| P103A, V100 | P147, V101 |
| P105A, V100 | P147, V102 |

When traffic from L2-PE 131 traverses tunnel 201 and reaches L2-PE 132, then L2-PE 132 uses a local mapping table to map traffic to the appropriate ports. It is understood that the tags have local significance. Table 2 provides an exemplary mapping (e.g., de-muxing) of the traffic transported across tunnel 201 to L2-PE 132. In FIG. 2, for the same number of customer devices as shown in FIG. 1, there are only two tunnels used (tunnel 201 and tunnel 202), instead of the six tunnels in FIG. 1.

TABLE 2

| Incoming Port (P) and VLAN (V) | Outgoing Tunnel Port and VLAN |
|---|---|
| P147, V100 | P101B, V100 |
| P147, V101 | P103B, V101 |
| P147, V102 | P105B, V100 |

Figure 3:
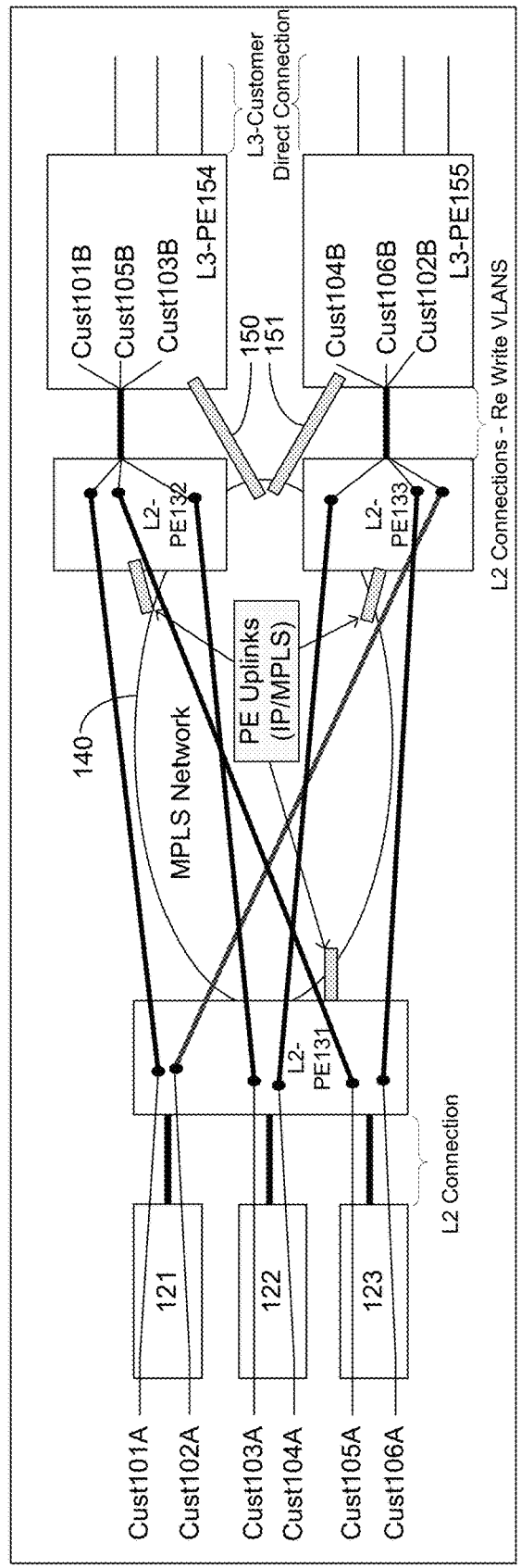
FIG. 3 illustrates an exemplary L2 point-to-point transport service hand-off to L3 services.

FIG. 3 illustrates an exemplary L2 point-to-point transport service hand-off to L3 services. Similar to FIG. 1, there are several tunnels that correspond to each VLAN associated with a customer device. In this configuration, a tunnel associated with a VLAN is terminated on an L2-PE (e.g., L2-PE 133 or L2-PE 132). L2-PE 132 hands off traffic to L3-PE 154 via a L2 connection after it rewrites the VLANs. Link 150 and 151 represent the connection from a L3-PE to MPLS Core 140. It is through these links that the L3-PE learns how to reach the other L3-PEs in the MPLS network. L3-PE 154 may route the customer traffic to a service such as the Internet by looking at the IP address in the received packet. In another example, if the customer traffic is a virtual private network (VPN) customer the flow will be directed in the VPN context.

Figure 4:
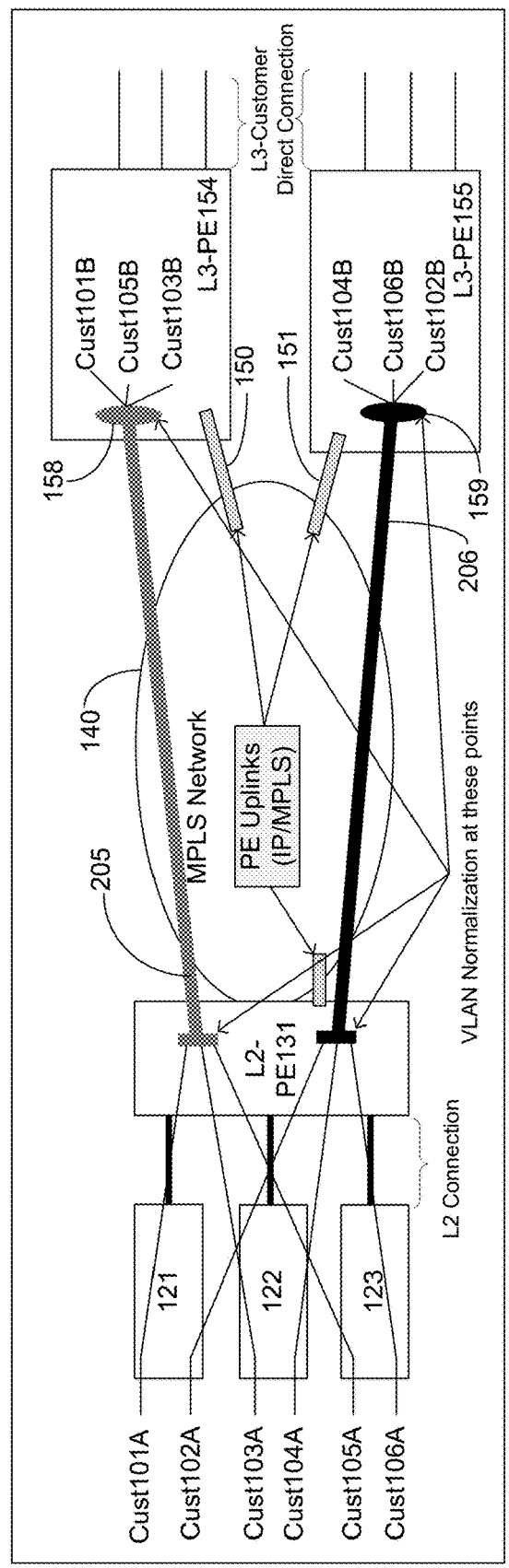
FIG. 4 illustrates an exemplary L2 point-to-point transport service hand-off to L3 services that uses tunnel context.

FIG. 4 illustrates an exemplary L2 point-to-point transport service hand-off to L3 services that uses a tunnel context. L3-PE is the point where L3 services are instantiated in a Service Provider's network. L3 refers to the network layer which in the ISO model processes, which include forwarding packets based on internet protocol addresses. Instead of terminating the tunnel on a L2 PE, as in FIG. 2, here the tunnel (e.g., tunnel 205 or tunnel 206) has an integrated pseudowire headend (PW-HE) (e.g., PW-HE 158 or PW-HE 159) which is terminated on a L3-PE (e.g., L3-PE 154 or L3-PE 155). The use of a PW-HE 158 that terminates on the L3-PE 154 eliminates the need to go through a L2-PE to hand-off to the L3-PE. In other words, tunnel 205 terminates L3-PE 154 (e.g., a router) and then the traffic for the individual VLANs are demuxed for the respective customers (e.g., cust 101, cust 103, or cust 105).

Figure 5:
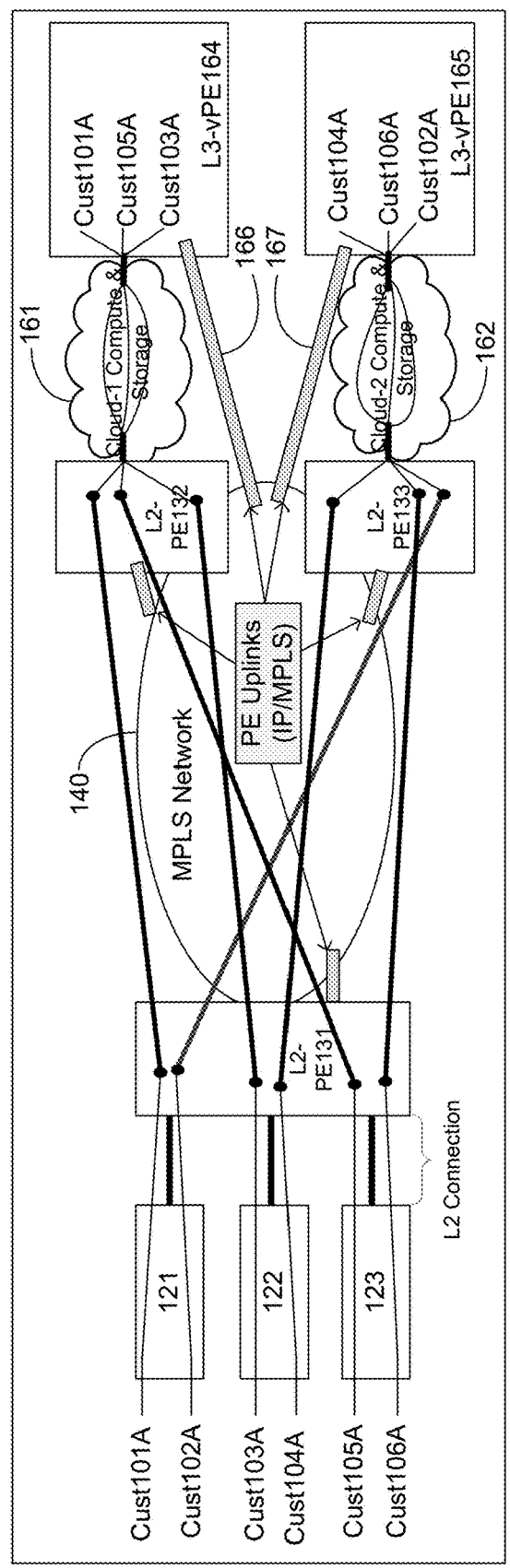
FIG. 5 illustrates an exemplary L2 point-to-point transport service hand-off to virtualized L3-PE in the cloud.
Figure 6:
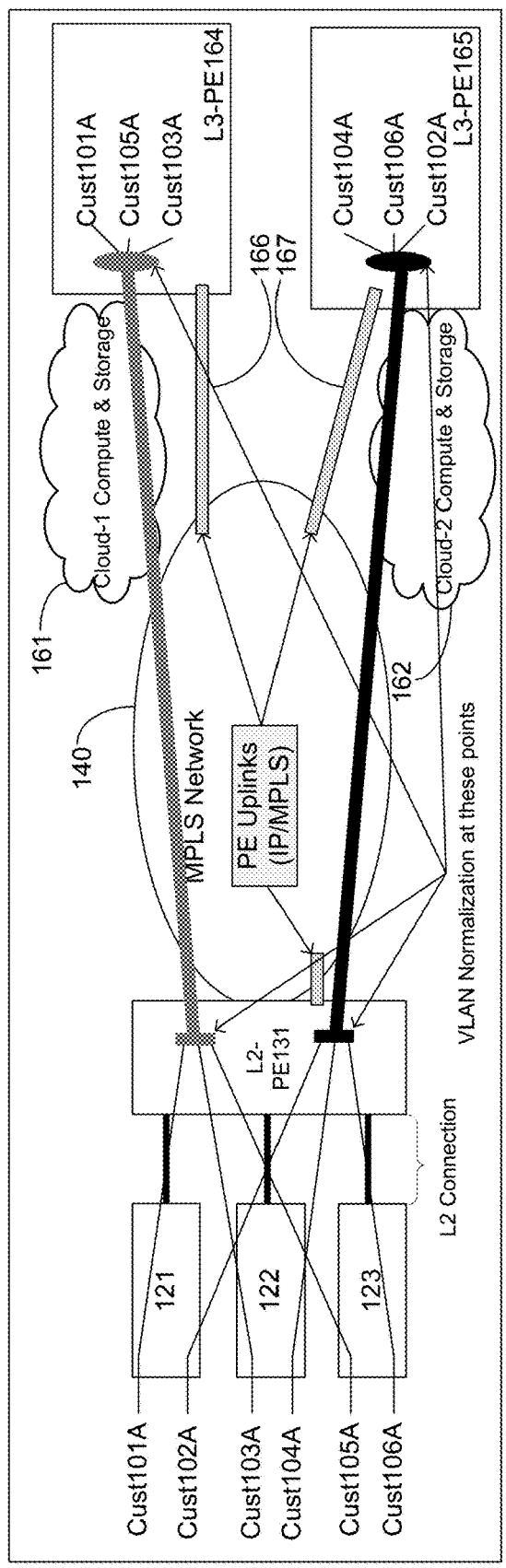
FIG. 6 illustrates an exemplary L2 point-to-point transport service hand-off to virtualized L3-PE (L3-vPE) in the cloud using tunnel context.

FIG. 5 illustrates an exemplary L2 point-to-point transport service hand-off to virtualized L3-PE in the cloud. A virtualized environment virtualizes a physical PE. Virtual PE have much of the PE functionality both control plane and data forwarding plane implemented in software and often run on common off the shelf (COTS) servers. The virtual PE (vPE) has a similar construct as a physical PE, such as an access circuit and an uplink. The uplink is built across the cloud so that it connects to the core router. Generally, the difference between a L3-vPE and a physical PE is that there is no direct customer connection, such as 100 gigabit circuit, a 10 gigabit circuit, etc. The virtual connection is logically mapped across the VLANs only. A vPE is usually used to service lower speed customers. L3-vPE 164 may be an Internet service and L3-vPE 165 may be a virtualization broadband network gateway (vBNG) type service. In an exemplary scenario, after traversing MPLS network 140 from L2-PE 131 to L2-PE 132, there is a hand off of the VLAN (e.g., cust 101A) to the L2 access circuit which connects to cloud 161, which may include a fabric network. An exemplary conventional method of mapping the traffic of cust 101A of L2-PE 132 to the virtual PE 164 is to configure VLANs on the intermediate switches that are within cloud 161. So in this scenario, each switch along the path needs the appropriate VLAN configuration to traverse switch to switch. FIG. 6 illustrates an exemplary L2 point-to-point transport service hand-off to virtualized L3-PE (L3-vPE) in the cloud using tunnel context as discussed herein. Again, this is similar to FIG. 4, but the tunnel traverses a cloud (computer or storage) infrastructure. As mentioned herein, the use of the tunnel context discussed herein may reduce or eliminate the need to configure the fabric network (e.g., cloud 161) in certain scenarios (e.g., L3-vPE migration).

Figure 7:
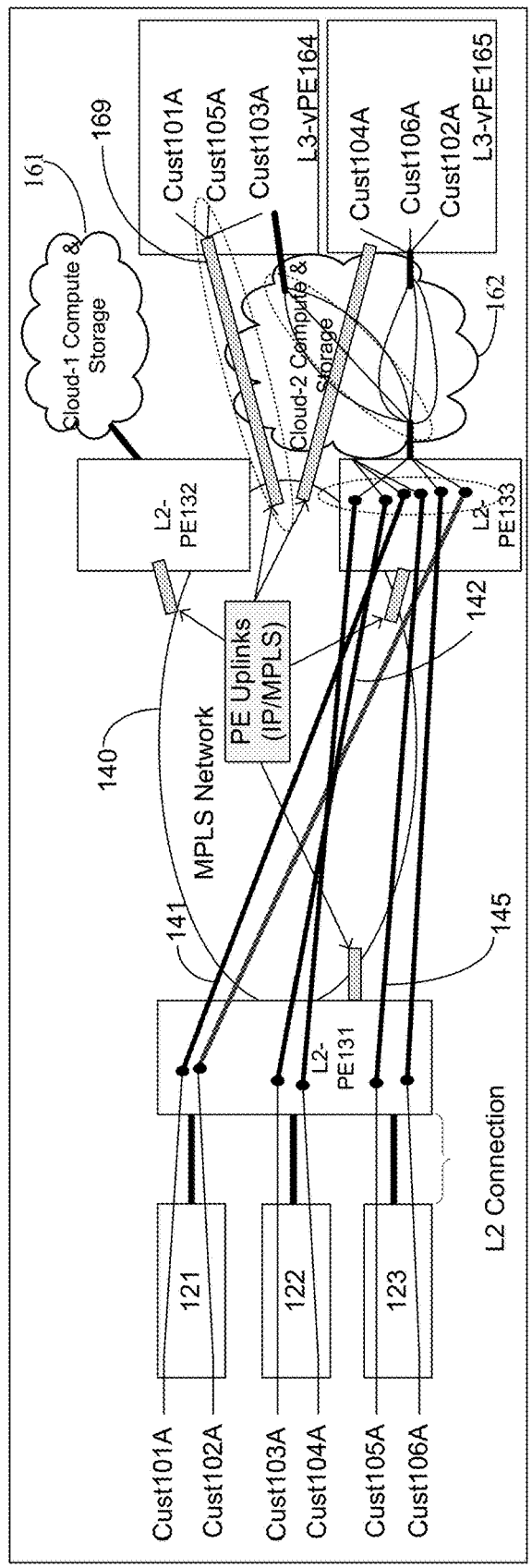
FIG. 7 illustrates an exemplary scenario where a L3-vPE is migrated from a first cloud to a second cloud.

FIG. 7 illustrates an exemplary scenario where a L3-vPE is migrated from a first cloud to a second cloud. L3-vPE 164 is migrated from cloud 161 to cloud 162, which may have occurred for any number of reasons, such as a sudden failure of hardware, a sudden failure of software, or regularly scheduled maintenance, among other things. FIG. 7 includes conventional methods of VLAN tunneling; therefore there are several levels of reconfiguration that would conventionally take place. There may be a manual or the like configuration of several nodes of FIG. 7 in order to execute the migration of L3-vPE 164 and the corresponding VLANs. Link 169 will need to be configured to L3-vPE 164. Also in FIG. 7, the configurations of the tunnels (e.g., tunnel 141, tunnel 142, and tunnel 145) must be removed or disabled. Link 169 must be configured to the MPLS core 140. Each VLAN tunnel (e.g., tunnel 141, tunnel 142, and tunnel 145) configured on L2-PE 132 (in this instance) must be configured on L2-PE 133. Nodes in cloud 162 (fabric network) must be configured for L3-vPE 164 and the corresponding VLANs. As can be observed there are multiple steps used to execute the migration of L3-vPE 164 from cloud 161 to cloud 162. Although a vPE is discussed herein, a vBNG or virtual anti-spoofing edge (vASE), among other things is contemplated.

With continued reference to FIG. 7, in addition, there should be a consideration of the possible organization inefficiencies of migrating using the conventional systems. Based on organizational structure of a service provider, migration in scenarios in which the conventional VLAN tunnels are used may be less efficient than migrations in scenarios where tunnel context methods and systems used herein. For example, many service providers are organized in a way such that L3-vPEs (e.g., L3-vPE 164 or L3-vPE 165) may be managed by one group of people, the fabric network (e.g., cloud 161 or cloud 162) may be managed by another group of people, and L2 PE's (e.g., L2-PE 132 or L2-PE 133) may be managed by another group. In this example, there must be coordination of these three operational groups in order to migrate L3-vPE 164 and the corresponding customer VLAN tunnels.

Figure 8:
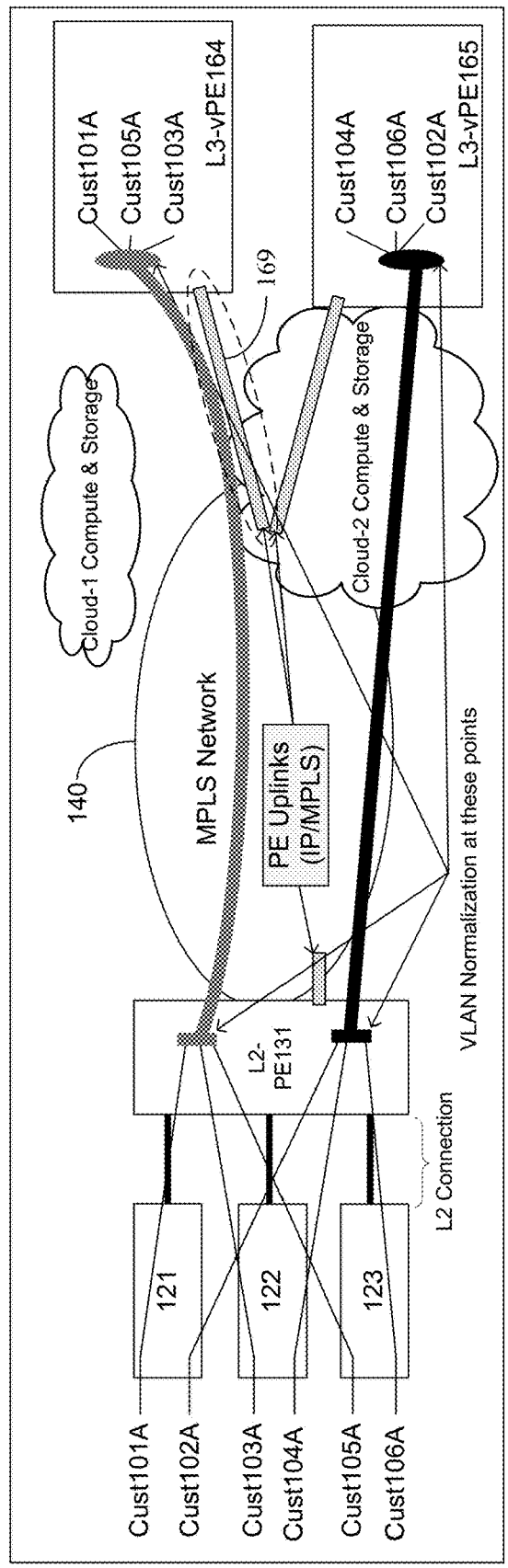
FIG. 8 illustrates an exemplary scenario where a L3-vPE is migrated from a first cloud to a second cloud when tunnel context is implemented.

FIG. 8 illustrates an exemplary scenario where a L3-vPE is migrated from a first cloud to a second cloud when tunnel context is implemented. The migration of L3-vPE 164 to cloud 162 is a relatively simple process, in which there is configuration of link 169 between MPLS network 140 and L3-vPE 164. So when link 169 and L3-vPE 164 are up, the corresponding tunnels associated with L3-vPE 164 may be formed through signaling of BGP or another routing protocol. Using tunnel context for VLANs as discussed herein may allow for a more efficient migration of different cloud infrastructure and improve the availability of a service when compared to some conventional methods.

Figure 9:
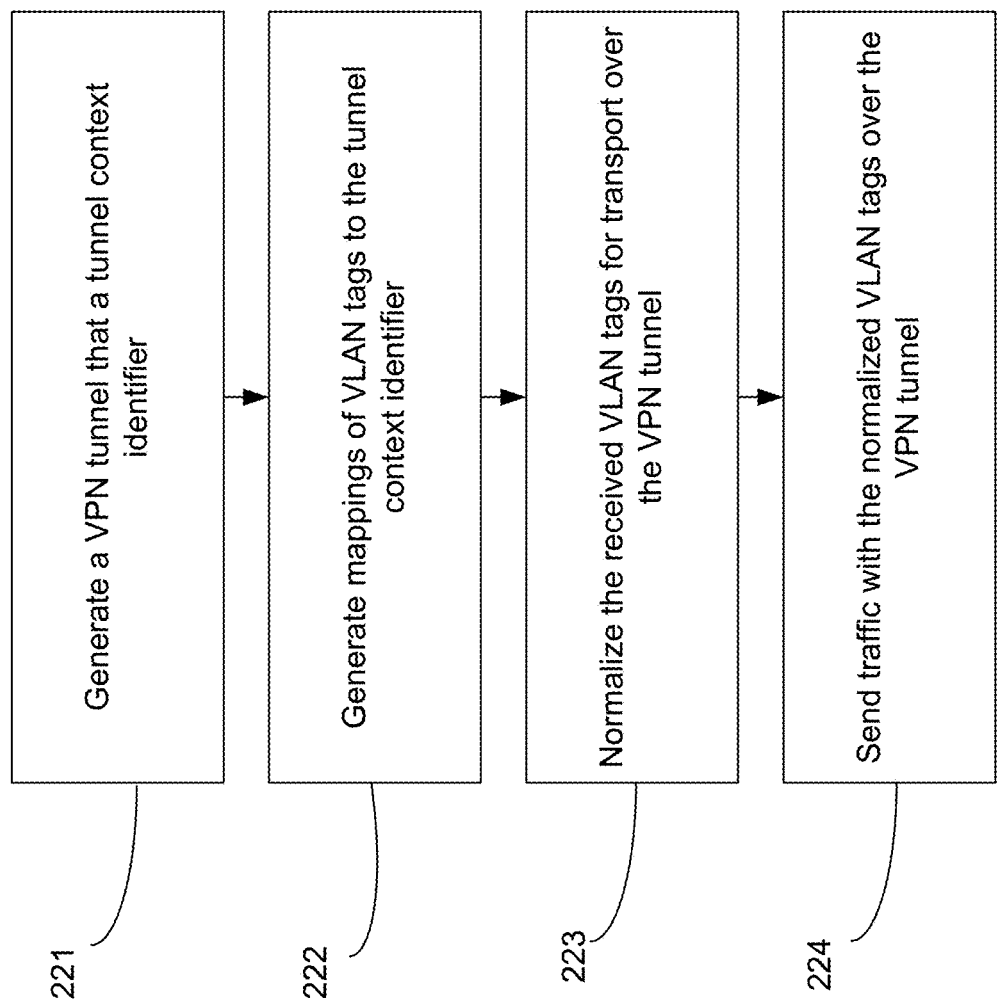
FIG. 9 illustrates an exemplary method for using tunnel context with VLANs.

FIG. 9 illustrates an exemplary method for using tunnel context with VLANs. At step 221, VPN tunnel 205 for VLANs may be generated at L2-PE 131. VPN tunnel 205 has a tunnel context identifier (e.g., 205) that may be an alphanumeric identifier (ID) for VPN tunnel 205. This tunnel may be signaled to Route Reflectors Control plane to be advertised to other PE's in the network. At step 222, a mapping of VLANs (e.g., port and tag) for L2-PE 131 to the tunnel context identifier may be generated on L2-PE 131. At step 223, VLAN traffic received from the access network (e.g., cust 101A, cust 103A, or cust 105) on L2-PE 131 is normalized for transport over VPN tunnel 205. Normalization may be part of the configuration at step 222. At step 224, the normalized VLAN traffic is sent over the core network (e.g., MPLS network 140) in the data-plane. Also in the control-planed, there is an option to signal these VLANs associated with this tunnel context to the Route Reflectors Control Plane for advertisement to other PE's in the network. As discussed herein, VPN tunnel 205 may terminate on a layer 3 virtual PE or physical PE.

Figure 10:
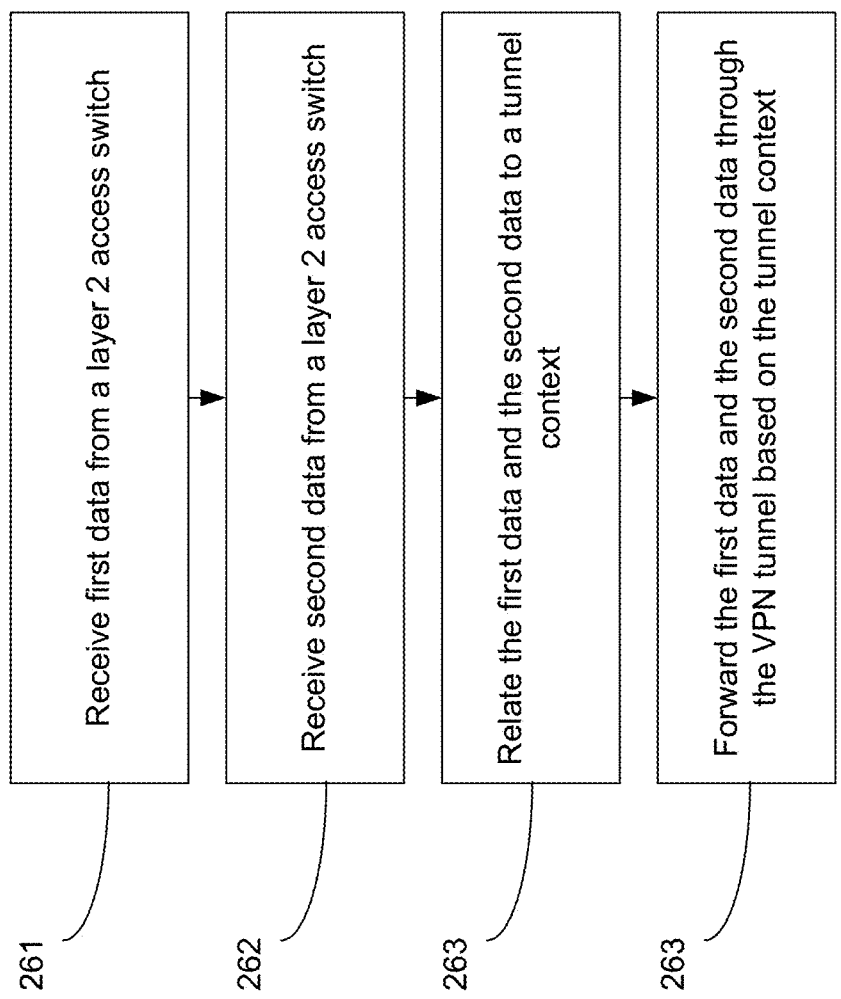
FIG. 10 illustrates an exemplary method for using tunnel context with VLANs.

FIG. 10 illustrates another exemplary method for using tunnel context with VLANs. At step 261, a layer 2 switch (e.g., L2-PE 131) may receive first data from a layer 2 access switch (e.g., L2-Access 121). The layer 2 switch may be a provider edge associated with a MPLS core network. The first data may be from a port on a first VLAN (e.g., VLAN 1). At step 262, L2-PE 131 may receive second data from L2-Access 121. The second data may be from the same port as the first data, but on a different VLAN (e.g., VLAN 2). At step 263, relate the first data and the second data to the same tunnel context of a VPN tunnel. At step 264, forward the first data and the second data through the VPN tunnel based on the tunnel context. The VPN tunnel may terminate on one or more layer 3 virtual provider edges.

Figure 11:
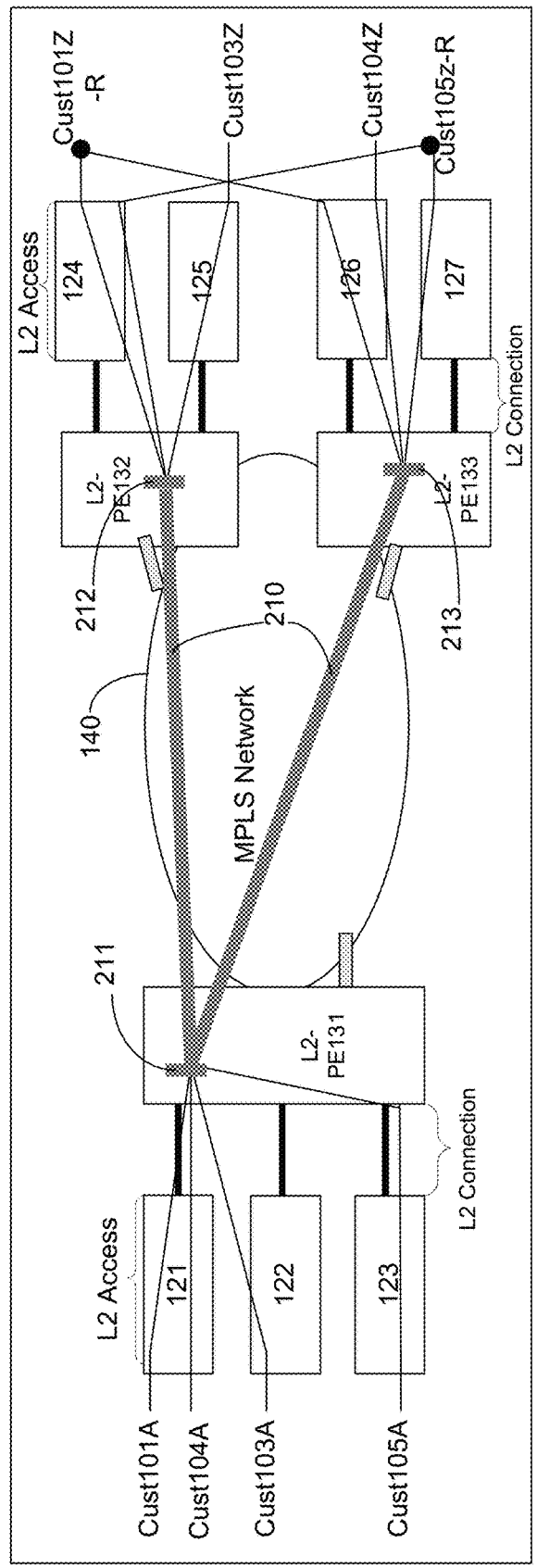
FIG. 11 illustrates an exemplary L2 point-to-point transport service for access redundant customer VLANs using tunnel context.

FIG. 11 illustrates an exemplary L2 point-to-point transport service for redundant customer VLANs. Tunnel 210 allows for the use of active-active aggregate tunnel architecture. As shown, tunnel 210 terminates in at termination point 211 on L2-PE 131, termination point 212 on L2-PE 132, and termination point 213 on L2-PE 133. Multiple VLANs are connected with tunnel 210. A single tunnel context (e.g., 210) may be used in each L2 PE. Flow-based hashing may be used to spread traffic for multi-homed VLANs (e.g., cust 101Z-R or cust 105Z-R). It is possible to keep track of the VLANs in tunnel 210 to transport both single-homed and multi-homed VLANs within the same tunnel 210. Cust 101Z-R and cust 105Z-R, which are multi-homed may have active-active access redundancy. This capability is particularly significant when considering Ethernet technologies and associated VLANs. In conventional VLAN tunneling systems, mainly active/backup is available to provide redundancy. In other words, traffic will flow on a backup tunnel once the active tunnel fails.

Figure 12:
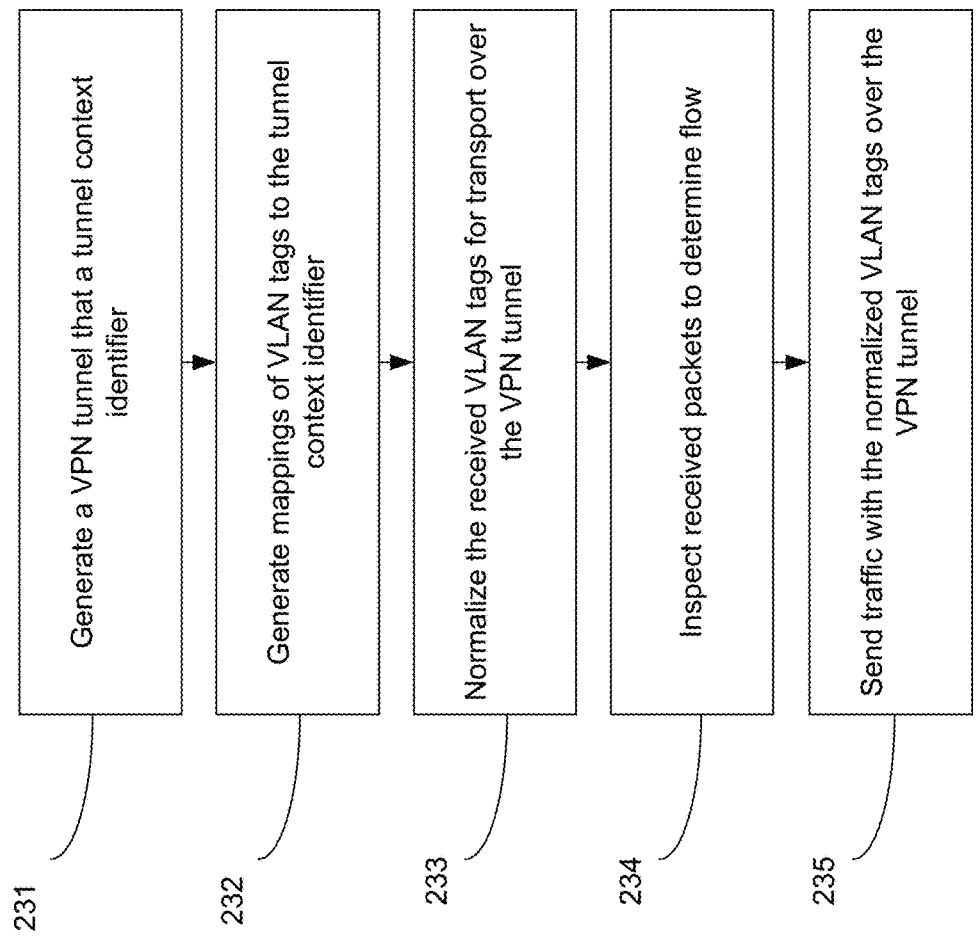
FIG. 12 illustrates an exemplary method for using tunnel context for access redundant customer VLANs.

FIG. 12 illustrates an exemplary method for using tunnel context for redundant customer VLANs. At step 231, VPN tunnel 210 for VLANs may be generated at L2-PE 131. VPN tunnel 210 has a tunnel context identifier (e.g., 210) that may be an alphanumeric identifier (ID) for VPN tunnel 210. VPN tunnel 210 terminates on L2-PE 131, L2-PE 132, and L2-PE 133 using the same tunnel context 210. At step 232, a mapping of VLANs (e.g., port and tag) for L2-PE 131 to the tunnel context identifier 210 may be generated on L2-PE 131. At step 233, VLAN traffic received from the access network (e.g., Cust 101A, Cust 103A, Cust 104A, or Cust 105) on L2-PE 131 is normalized for transport over VPN tunnel 210. At step 234, the received VLAN traffic may have their packets inspected to determine a flow (e.g., HTTP request, IP source, IP destination, port #, etc.). It is contemplated herein may be determined based on an application layer protocol (layer 7), transport layer protocol (layer 4), or other layers of the open systems interconnection model. The VLAN traffic may be directed to L2-PE 132 or L2-PE 133 over tunnel 210 based on flow when there are multi-homed devices (e.g., cust 105Z-R or cust 101Z-R). At step 235, the normalized VLAN traffic is sent over the core network (e.g., MPLS network 140). Another way to consider flow is based on VLAN. So it is possible that cust 101, instead of just showing that one VLAN, he has hundreds of VLANs. So a first VLAN may be on the top tunnel and second VLAN may be on the bottom tunnel, etc. for load balancing. Something in the received packet must be keyed upon to configure L2 or L3 hashing for the flow.

Figure 13:
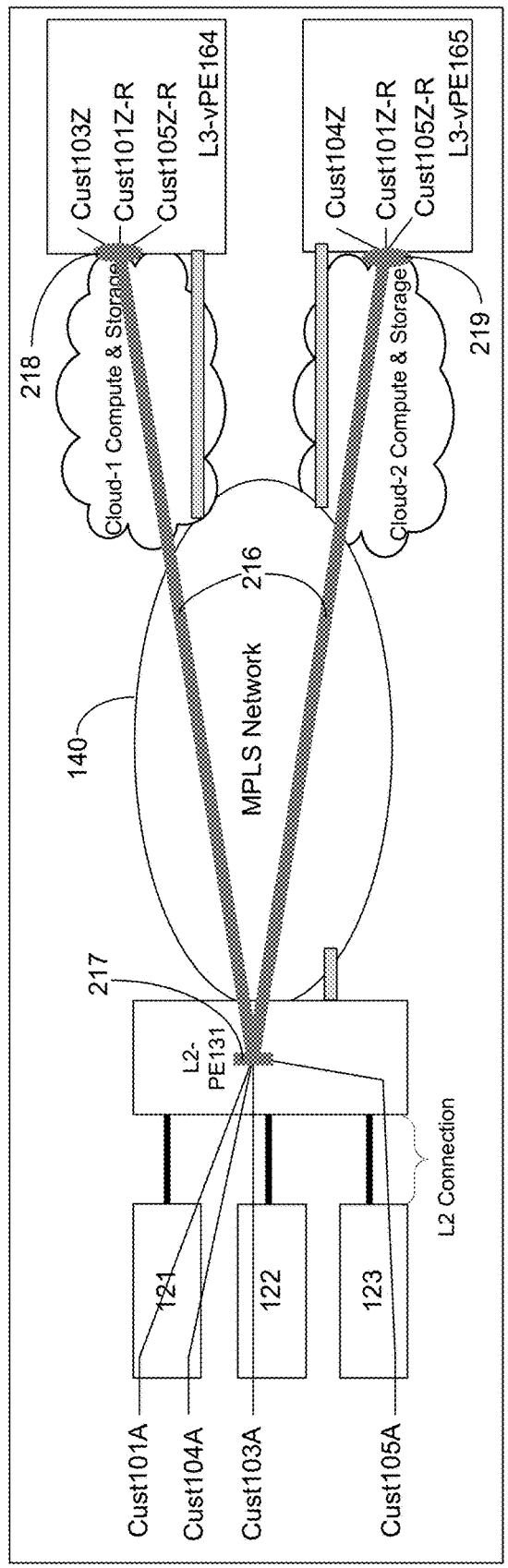
FIG. 13 illustrates an exemplary L2 point-to-point transport service hand-off to geo-redundant virtualized L3-vPE in cloud using tunnel context.

FIG. 13 illustrates an exemplary L2 point-to-point transport service hand-off to geo-redundant virtualized L3-vPE in cloud. VPN Tunnel 216 allows for the use of active-active aggregate tunnel architecture. As shown, tunnel 216 terminates at termination point 217 on L2-PE 131, termination point 218 on L3-vPE 164, and termination point 219 on L3-PE 165. Multiple VLANs are connected with tunnel 216.

A single tunnel context (e.g., 216) may be used for each termination point. Flow-based hashing may be used to spread traffic for multi-homed VLANs (e.g., cust 101Z-R or cust 105Z-R). It should be understood that L3-vPE 164 and L3-vPE 165 may be considered a service, so in this case cust 101Z-R or cust 105Z-R may have a geo-redundant L3-vPEs in order to process traffic from access VLAN. Cust 101Z-R or cust 105Z-R may have purchased a higher level of service to obtain the observed redundancy. Cust 101Z-R and cust 105Z-R, which are multi-homed may have active-active access redundancy. The VLAN traffic may be directed to L3-vPE 164 or L3-PE 165 over tunnel 216 based on flow when there is geo-redundancy, as shown in FIG. 13. In conventional VLAN tunneling systems, generally active/ backup is available to provide redundancy. In other words, traffic will flow on a backup tunnel once the active tunnel fails. In the conventional scenario, there must be coordination of a manual shutdown and no shutdown of the VLANs in L3-vPE to match the Active/Backup state of the MPLS pseudowires. The VLAN would be in shutdown mode because the tunnel path is back up.

With reference to FIG. 11 and FIG. 13, the systems allow for active-active scenarios in a way that may more fully utilize the resources of a service provider network or customer network. In a virtual device (service) scenario, if a customer (e.g., cust 101) is buying a service, the service provider may desire the customer be on a redundant server or geo-redundant site. In an example, if VLAN traffic comes in on L2-PE 131 from cust 101A, there may be hash on the IP (or something else) and L2-PE 131 may send the VLAN traffic to L3-vPE 164 in cloud 161 based on a first flow and L3-vPE 165 in cloud 162 based on a second flow. The service provider in this instant may be improving reliability and the customer may have no knowledge of the multiple L3-vPEs that is used for the service. The tunnel endpoints are signaled such that movement of a VM that includes a vPE, vBNG, vASE, or the like does not cause a redefinition of the tunnel at either end (e.g., L2-PE 131 and L3-vPE 164).

As observed, there is a simplification from six tunnels in FIG. 1 to two tunnels in FIG. 2, for example. The methods and system disclosed herein provides a plurality of technical effects, which are discussed in more detail herein. First, the methods and systems may allow for easier migration of circuits when compared to conventional systems. Second the methods and systems associated herein may shift the use of memory allocation. So there may be less memory on L2-PEs used in association with MPLS (or other core network VPN technology for handling the tunnels) and a shift of memory usage into a different type of memory, which is more associated with the VLAN. Chip vendors have different design strategies to optimize between cost, power, cooling, and performance. There may be different on chip memory banks for different functions. Fabric Access Tunnels reduces the requirements on the MPLS forwarding and shift the burden on the VLAN swapping/switching function local to each box, which may be advantageous in some situations.

Ethernet has not been traditionally used as a point-to-point technology. Conventionally, an individual VLAN is mapped to a pseudowire. Here we are using it as a circuit technology and providing flexible Ethernet grooming. A set of VLANs are mapped to tunnel based on a tunnel context which allows VLANs to come from different ports, which is unlike conventional pseudowire VLANs that usually come from a single port. Multipoint bridging done in the traditional context has its own set of issues. Multipoint bridging inspects Ethernet packet and forwards based on MAC addresses, which is called address learning. In multipoint bridging, VLAN addresses would be global to the whole device. This is not what we are doing here. As discussed herein, the VLAN tag is made local to the port. Also herein, just the VLAN tag may be used for tunneling decisions, while inspection of the MAC addresses is not needed.

Figure 14:
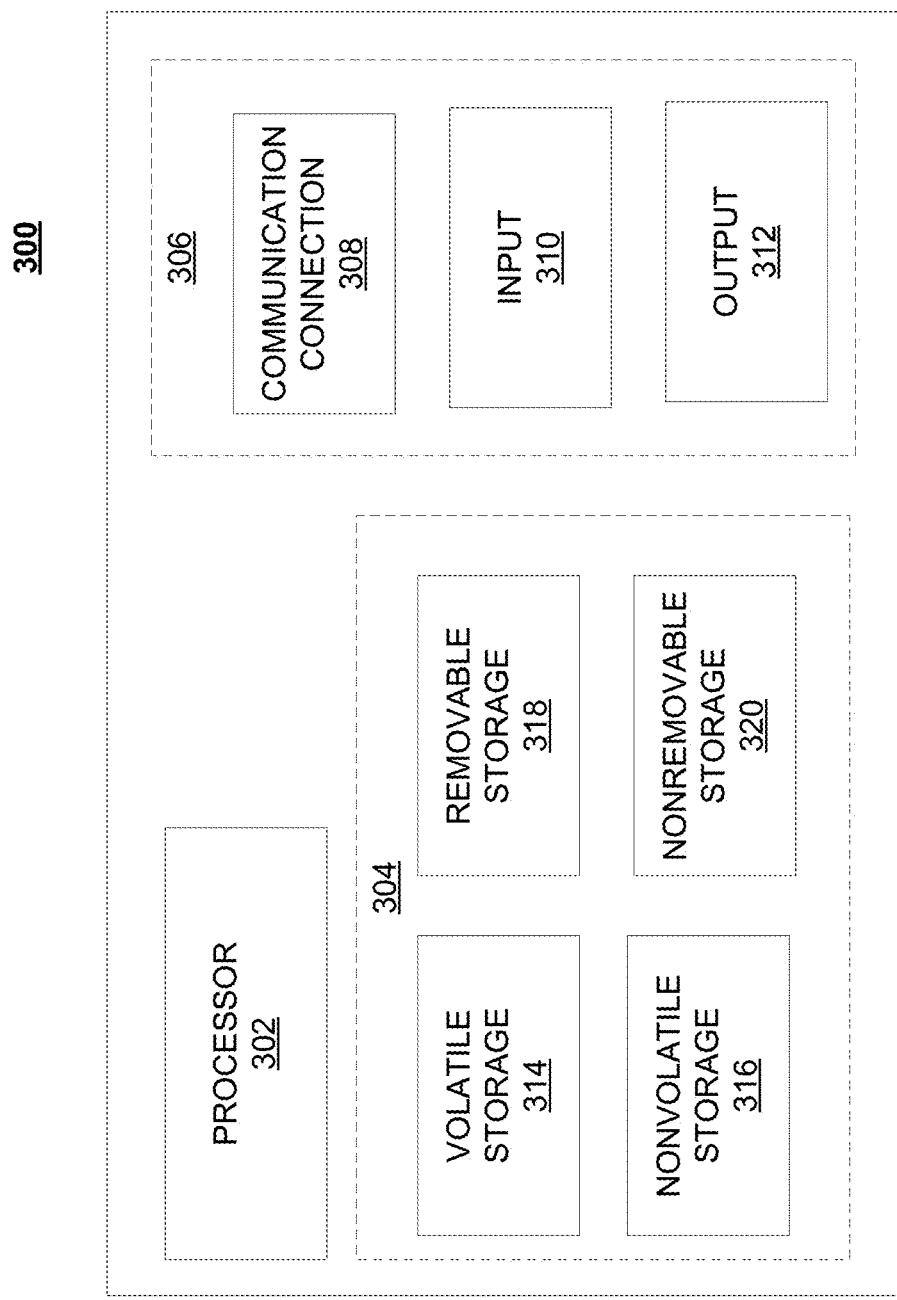
FIG. 14 illustrates a schematic of an exemplary network device.

FIG. 14 is a block diagram of network device 300 that may be connected to or comprise a component of the networks in FIG. 1-FIG. 13, among others. Network device 300 may comprise hardware or a combination of hardware and software. The functionality to facilitate telecommunications via a telecommunications network may reside in one or combination of network devices 300. Network device 300 depicted in FIG. 14 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 14 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 14) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 15:
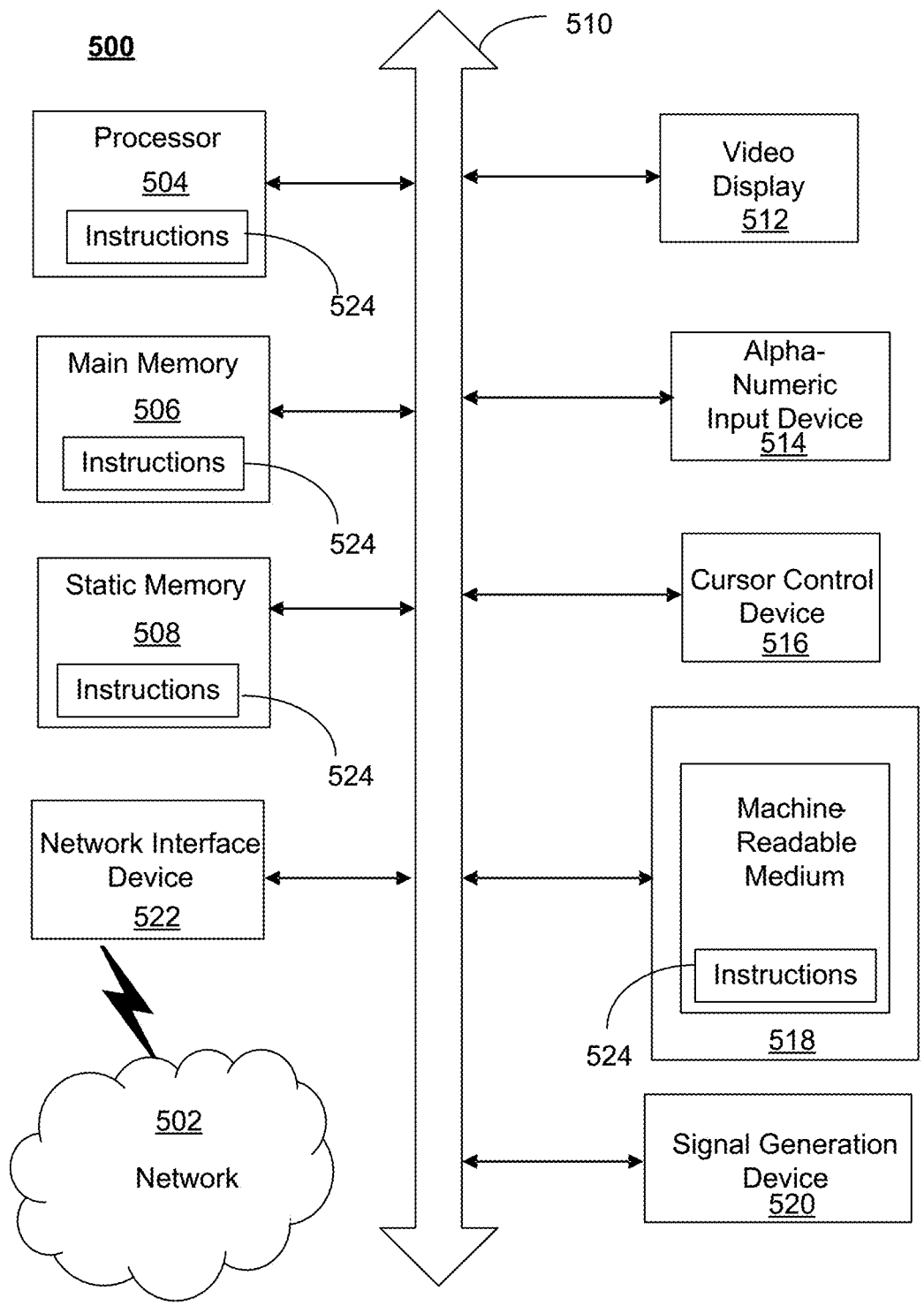
FIG. 15 illustrates an exemplary communication system that provides wireless telecommunication services over wireless communication networks.

FIG. 15 depicts an exemplary diagrammatic representation of a machine in the form of a computer system 500 within which a set of instructions, when executed, may cause the machine to perform any one or more of the methods described herein. One or more instances of the machine can operate, for example, as processor 302, L2-PE 131, L3-PE 154, or other devices of FIG. 1 through FIG. 13. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

While examples of a telecommunications system in which fabric access tunnels processed and managed have been described in connection with various computing devices/processors, the underlying concepts may be applied to other computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—fabric access tunnels—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A network switch comprising:
   a processor; and
   a memory coupled with the processor, the memory comprising executable instructions that when executed by the processor cause the processor to effectuate operations comprising:
   receiving first data from a layer two switch, wherein the first data is from a port on a first virtual local area network (VLAN);
   relating the first data to a tunnel context identifier of a virtual private network (VPN) tunnel, wherein the VPN tunnel remotely terminates on at least a first virtual machine and a second virtual machine; and
   forwarding the first data through the VPN tunnel based on the tunnel context, wherein the VPN tunnel has a multiple leg connection that comprise:
   a first leg of the VPN tunnel between the network switch and the first virtual machine; and
   a second leg of the VPN tunnel between the network switch and the second virtual machine, wherein the first virtual machine and the second virtual machine are a virtual anti-spoofing edge.

2. The network switch of claim 1, further operations comprising determining whether to forward the first data through the first leg based on a first flow and forwarding the first data through the second leg based on a second flow.

3. The network switch of claim 1, further operations comprising determining whether to forward the first data through the first leg or the second leg based on a flow of the first data, wherein the flow is determined based on an internet protocol address of the first data, port number of the first data, or application protocol of the first data.

4. The network switch of claim 1, further operations comprising determining whether to forward the first data through the first leg or the second leg based on a flow of the first data, wherein the flow is determined based on a port number of the first data.

5. The network switch of claim 1, further operations comprising normalizing the first data for transport over the VPN tunnel.

6. The network switch of claim 1, further operations comprising determining whether to forward the first data through the first leg or the second leg based on a flow of the first data, wherein the flow is determined based on a port number of the first data.

7. A computer readable storage medium comprising computer executable instructions that when executed by a computing device cause said computing device to effectuate operations comprising:
   receiving first data from a layer two switch, wherein the first data is from a port on a first virtual local area network (VLAN);
   relating the first data to a tunnel context identifier of a virtual private network (VPN) tunnel, wherein the VPN tunnel remotely terminates on at least a first virtual machine and a second virtual machine; and
   forwarding the first data through the VPN tunnel based on the tunnel context, wherein the VPN tunnel has a multiple leg connection that comprise:
   a first leg of the VPN tunnel between the network switch and the first virtual machine; and
   a second leg of the VPN tunnel between the network switch and the second virtual machine, wherein the first virtual machine and the second virtual machine are a virtual broadband network gateway.

8. The computer readable storage medium of claim 7, further operations comprising determining whether to forward the first data through the first leg based on a first flow and forwarding the first data through the second leg based on a second flow.

9. The computer readable storage medium of claim 7, further operations comprising determining whether to forward the first data through the first leg or the second leg based on a flow of the first data, wherein the flow is determined based on an internet protocol address of the first data, port number of the first data, or application protocol of the first data.

10. The computer readable storage medium of claim 7, wherein the first virtual machine and the second virtual machine are a virtual layer three provider edge.

11. The computer readable storage medium of claim 7, further operations comprising normalizing the first data for transport over the VPN tunnel.

12. A method comprising:
receiving first data from a layer two switch, wherein the first data is from a port on a first virtual local area network (VLAN);
relating the first data to a tunnel context identifier of a virtual private network (VPN) tunnel, wherein the VPN tunnel remotely terminates on at least a first virtual machine and a second virtual machine; and
forwarding the first data through the VPN tunnel based on the tunnel context, wherein the VPN tunnel has a multiple leg connection that comprise:
a first leg of the VPN tunnel between the network switch and the first virtual machine; and
a second leg of the VPN tunnel between the network switch and the second virtual machine, wherein the first virtual machine and the second virtual machine are a virtual anti-spoofing edge.

13. The method of claim 12, further comprising determining whether to forward the first data through the first leg based on a first flow and forwarding the first data through the second leg based on a second flow.

14. The method of claim 12, further comprising determining whether to forward the first data through the first leg or the second leg based on a flow of the first data, wherein the flow is determined based on an internet protocol address of the first data, port number of the first data, or application protocol of the first data.

* * * * *